US008887624B2

(12) United States Patent
Magno

(10) Patent No.: US 8,887,624 B2
(45) Date of Patent: Nov. 18, 2014

(54) BEVERAGE BREWING APPARATUS

(75) Inventor: Alessandro Magno, Brembate Sopra (IT)

(73) Assignee: N&W Global Vending S.p.A., Valbrembo (IT)

(*) Notice: Subject to any disclaimer, the term of this patent is extended or adjusted under 35 U.S.C. 154(b) by 1039 days.

(21) Appl. No.: 12/992,566

(22) PCT Filed: May 13, 2009

(86) PCT No.: PCT/IB2009/005578
§ 371 (c)(1),
(2), (4) Date: Mar. 8, 2011

(87) PCT Pub. No.: WO2009/138856
PCT Pub. Date: Nov. 19, 2009

(65) Prior Publication Data
US 2011/0146499 A1   Jun. 23, 2011

(30) Foreign Application Priority Data

May 14, 2008   (IT) ............................... TO2008A0361

(51) Int. Cl.
*A47J 31/46*   (2006.01)
*A47J 31/36*   (2006.01)

(52) U.S. Cl.
CPC .............. *A47J 31/3609* (2013.01); *A47J 31/46* (2013.01)
USPC ........................................................ 99/302 P

(58) Field of Classification Search
CPC ... A47J 31/3614; A47J 31/36; A47J 31/3633; A47J 31/21; A47J 31/3609

USPC ........ 99/297, 302 P, 283, 209, 299, 305, 309; 426/431–433, 594, 597

See application file for complete search history.

(56) References Cited

U.S. PATENT DOCUMENTS

| 4,721,035 | A | * | 1/1988 | Chang-Diaz | ..................... 99/297 |
| 4,832,951 | A | * | 5/1989 | Chang-Diaz | .................. 424/520 |
| 5,302,407 | A | * | 4/1994 | Vetterli | .......................... 426/433 |
| 5,551,331 | A | * | 9/1996 | Pfeifer et al. | ................... 99/280 |
| 5,622,099 | A | * | 4/1997 | Frei | ................................... 99/287 |
| 8,367,136 | B2 | * | 2/2013 | Doglioni Majer | ............ 426/431 |
| 8,522,670 | B2 | * | 9/2013 | Tonelli et al. | ................... 99/300 |
| 2006/0117960 | A1 | * | 6/2006 | Fischer | ............... 99/279 |
| 2007/0012194 | A1 | * | 1/2007 | Oehninger | ....................... 99/279 |
| 2009/0136639 | A1 | * | 5/2009 | Doglioni Majer | ............ 426/431 |
| 2009/0151573 | A1 | * | 6/2009 | Tonelli et al. | ................... 99/280 |
| 2013/0115350 | A1 | * | 5/2013 | Majer | .............................. 426/431 |
| 2013/0129885 | A1 | * | 5/2013 | Doglioni Majer | ............ 426/431 |
| 2013/0233175 | A1 | * | 9/2013 | Giacomin | ........................ 99/280 |

FOREIGN PATENT DOCUMENTS

DE    4208854       *  9/1993
DE   202006014317   *  2/2008
(Continued)

*Primary Examiner* — Dana Ross
*Assistant Examiner* — Frederick Calvetti
(74) *Attorney, Agent, or Firm* — Dickstein Shapiro LLP

(57) ABSTRACT

A beverage brewing apparatus, the brewing apparatus having an infusion chamber for housing material to be percolated and for receiving pressurized water; a beverage outflow conduit connecting the infusion chamber to the outside; and a valve located between an inlet portion and an outlet portion of the outflow conduit; the valve being a three-way valve having an inlet communicating with the infusion chamber via the inlet portion of the outflow conduit; a first outlet communicating with the outlet portion of the outflow conduit; and a second outlet communicating with the outside.

7 Claims, 2 Drawing Sheets

(56) References Cited

FOREIGN PATENT DOCUMENTS

| DE | 20 2006 014 317 U1 | | 3/2008 |
|---|---|---|---|
| EP | 1 264 568 | A1 | 12/2002 |
| EP | 1264568 | * | 12/2002 |
| EP | 1902653 | * | 3/2008 |
| WO | WO2007014891 | * | 2/2007 |

* cited by examiner

BEVERAGE BREWING APPARATUS

TECHNICAL FIELD

The present invention relates to a beverage brewing apparatus.

More specifically, the present invention relates to a beverage brewing apparatus of the type comprising an infusion chamber for housing material to be percolated and for receiving pressurized water; a beverage outflow conduit connecting the infusion chamber to the outside; and a valve movable between a normal closed position, and an open position allowing access by the beverage to the outflow conduit.

BACKGROUND ART

A common major drawback of brewing apparatuses of the above type is that, when the valve is set back to the normal closed position after the beverage is dispensed, the outflow conduit fails to empty completely, and retains a certain amount of beverage which, if the brewing apparatus is not opened and used immediately to produce another beverage, settles inside the outflow conduit and results in dripping.

Moreover, if a valveless brewing apparatus is used immediately after the beverage is dispensed to produce another beverage, a suction effect is produced in the outflow conduit when the infusion chamber is opened, thus drawing the leftover beverage back into the infusion chamber.

To eliminate this drawback and completely drain the outflow conduit, it has been proposed to equip the brewing apparatus with suction means which, after the beverage is dispensed, draw the leftover beverage in the outflow conduit into a container. One example of this solution is described in US 2007/0012194, in which the suction means comprise a drain valve located downstream from the outflow conduit inlet, and which connects the outflow conduit to a drain conduit that comes out inside the container. In actual use, when outflow of the beverage is cut off by closing a needle valve interposed between the infusion chamber and the outflow conduit inlet, the drain valve opens to lower the pressure inside the outflow conduit sufficiently to draw any leftover beverage into the drain conduit and the container.

Though effective, this solution has the drawback of producing serious structural complications of the brewing apparatus, which, in addition to the manufacturing problems and expense involved, increase the overall size of the brewing apparatus, thus making it less compact and less flexible in terms of use.

DISCLOSURE OF INVENTION

It is an object of the present invention to provide a brewing apparatus of the type described above, which is cheap and easy to produce and, at the same time, provides for completely draining the outflow conduit after the beverage is dispensed.

According to the present invention, there is provided a beverage brewing apparatus, as claimed in Claim 1 and preferably in any one of the following Claims depending directly or indirectly on Claim 1.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
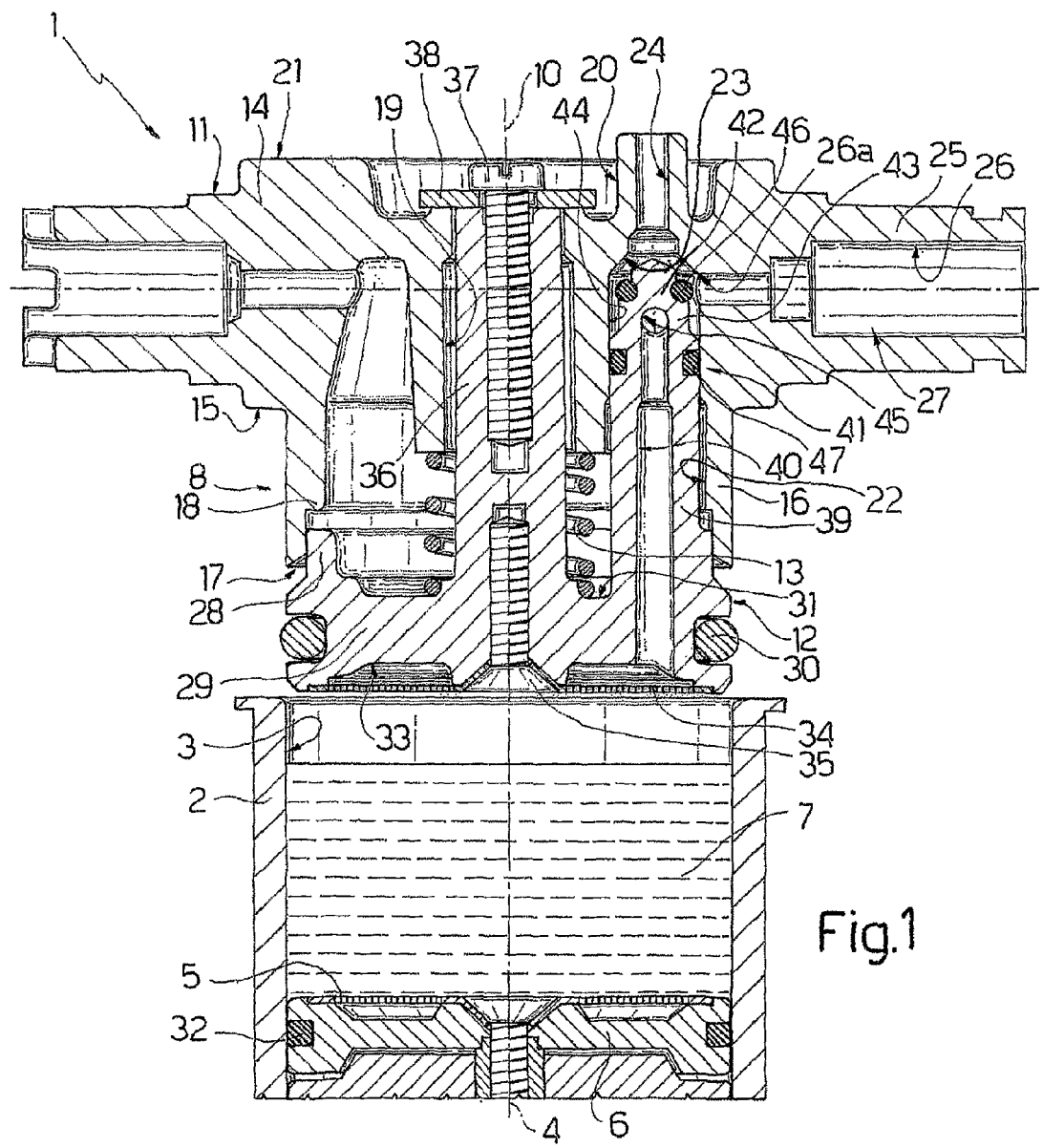
FIGS. 1 and 2 show axial sections, with parts removed for clarity, of a preferred embodiment of the brewing apparatus according to the present invention in respective different operating configurations.

Number 1 in FIG. 1 indicates as a whole a beverage brewing apparatus.

Brewing apparatus 1 comprises a cup-shaped body 2 defining a seat 3, which has a longitudinal axis 4, is bounded at the bottom by a perforated end plate 5 of an ejector piston 6, and is for housing a measure of powdered material 7.

Figure 2:
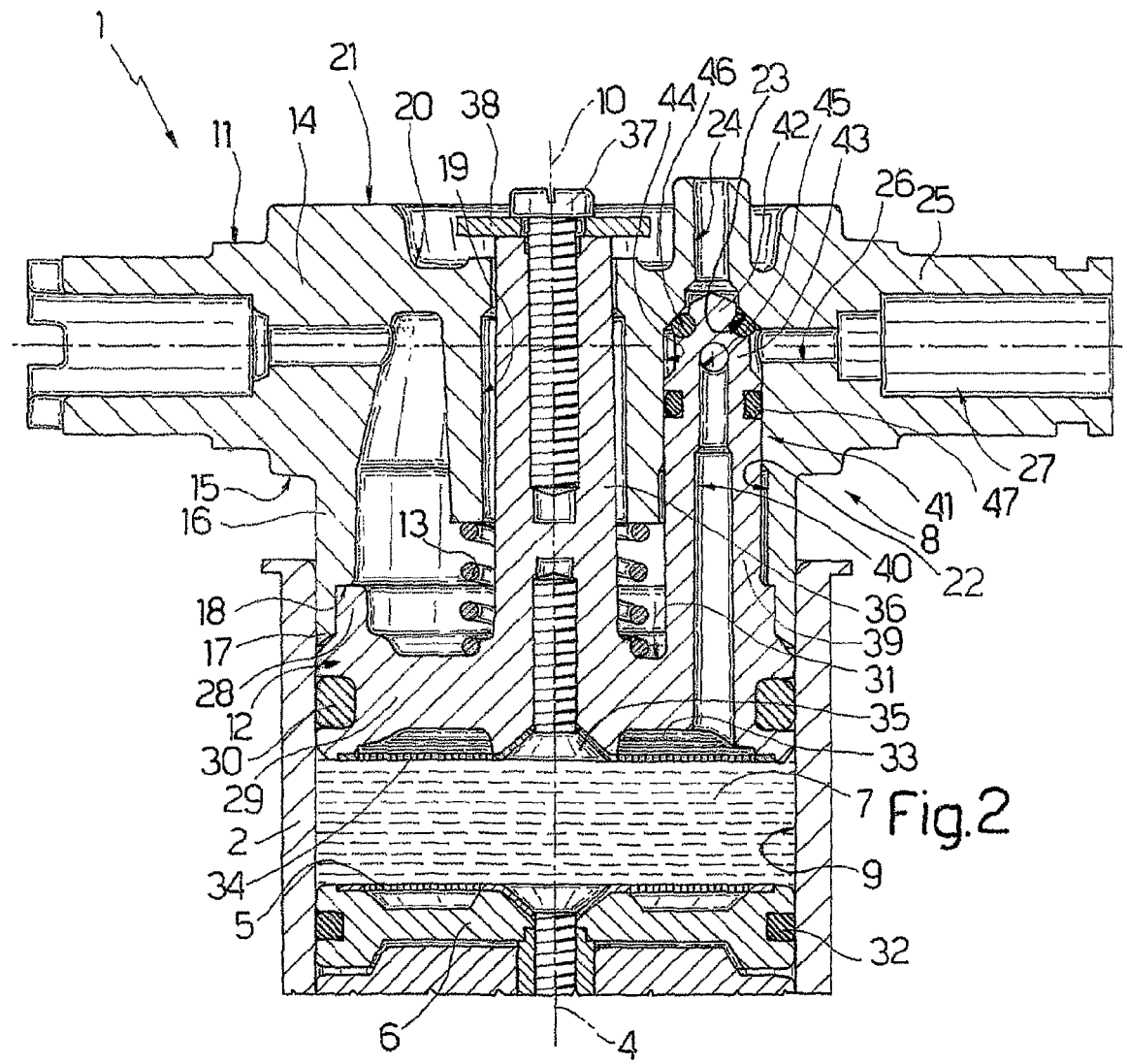

Brewing apparatus 1 also comprises a compression piston 8 positioned facing cup-shaped body 2 and which is movable for insertion, in use, inside seat 3 to compress material 7 inside the seat and define, inside seat 3, an infusion chamber 9 (FIG. 2).

Compression piston 8 is a telescopic piston having a longitudinal axis 10, which coincides with axis 4 when compression piston 8 is inserted inside cup-shaped body 2 (FIG. 2), and comprising a main body 11; and a head 12 coaxial with main body 11 and axis 10, and connected telescopically to main body 11 to move, with respect to main body 11 and along axis 10, from a normal extracted position (FIG. 1) to a withdrawn position (FIG. 2) in opposition to a coil spring 13 coaxial with axis 10 and compressed between head 12 and main body 11.

Main body 11 comprises an end plate 14 crosswise to axis 10 and having a surface 15, from which a tubular sleeve 16 projects coaxially with axis 10 and has a free edge 17, along the inner periphery of which a groove is formed defining, inside sleeve 16, an annular shoulder 18 crosswise to axis 10. Through plate 14 are formed: an axial through hole 19, which is coaxial with axis 10 and comes out, at one end, at the bottom of a cavity 20 formed, coaxially with axis 10, in a surface 21, opposite surface 15, of plate 14; and a further hole 22 formed, parallel to hole 19, through surface 15, and terminating, at the end facing surface 21, with a truncated-cone-shaped portion 23, the end facing surface 21 of which communicates with a relief hole 24 coaxial with hole 22 and communicating with the outside through surface 21.

Plate 14 has a tubular lateral appendix 25 crosswise to axis 10 and having an inner conduit, which defines an outlet portion 26 of an outflow conduit 27 and communicates, via a hole 26a, with a point along hole 22 adjacent to truncated-cone-shaped portion 23.

Head 12 is cup-shaped and comprises a tubular lateral wall 28, which is coaxial with axis 10 and closed, at the end facing cup-shaped body 2, by a bottom wall 29, the outer periphery of which projects outwards of lateral wall 28, is substantially the same size as the outer cross section of sleeve 16, and has an annular groove housing a seal 30 which engages seat 3 of cup-shaped body 2 in fluidtight manner. Lateral wall 28 is shaped and sized to telescopically engage and slide along the inside of sleeve 16, in a direction parallel to axis 10 and in opposition to spring 13 compressed between plate 14 and an inner surface 31 of bottom wall 29, until a free end of lateral wall 28 comes to rest against annular shoulder 18.

When compression piston 8 is inserted inside seat 3, seal 30 cooperates with a lateral wall of cup-shaped body 2 to fluidtight seal infusion chamber 9, together with a seal 32 fitted to ejector piston 6.

A catch cavity 33 is formed axially in the surface of bottom wall 29 facing cup-shaped body 2, and is closed at the bottom by a perforated plate 34 fixed rigidly to bottom wall 29 by a screw 35.

Head 12 comprises a rod 36 which extends, coaxially with axis 10, from inner surface 31 of bottom wall 29 to plate 14, engages hole 19 in sliding manner, and has a free end which projects from hole 19 into cavity 20 and is fitted by a screw 37 with a transverse stop member 38 which, when head 12 is in the normal extracted position, is held resting on the bottom of cavity 20 by spring 13.

Head 12 also comprises a tubular appendix 39 which extends parallel to axis 10 from surface 31, and has an axial conduit which communicates with cavity 33 through bottom wall 29 and defines an inlet portion 40 of outflow conduit 27. Tubular appendix 39 engages hole 22 in sliding manner, and cooperates with main body 11 to define a three-way slide valve 41 for controlling the hydraulic connections between inlet portion 40, outlet portion 26, and relief hole 24, to ensure continuity of outflow conduit 27 and communication between outflow conduit 27 and relief hole 24 when head 12 is in the normal extracted position, and to cut off such communication, while still ensuring the continuity of outflow conduit 27, when head 12 is in the withdrawn position.

Accordingly, the free end of tubular appendix 39 has a tip 42 which engages truncated-cone-shaped portion 23 of hole 22; and, below tip 42, a smaller-section end portion 43 which, together with the inner surface of hole 22, defines an annular chamber 44 forming the distribution chamber of three-way valve 41, the movable part or slide of which is defined by tubular appendix 39, and the slide face of which is defined by hole 22. Annular chamber 44 comprises an inlet defined by a diametrical hole 45 formed in end portion 43 of tubular appendix 39 and connecting annular chamber 44 to infusion chamber 9 via inlet portion 40 of outflow conduit 27; a first outlet defined by hole 26a and connecting annular chamber 44 to outlet portion 26 of outflow conduit 27; and a second outlet defined by relief hole 24 and connecting annular chamber 44 to the outside.

At opposite ends of end portion 43 of tubular appendix 39, two annular grooves are formed housing respective sealing rings 46 and 47; sealing ring 46 is interposed between end portion 43 and tip 42, and only engages truncated-cone-shaped portion 23 of hole 22 in fluidtight manner, thus cutting off communication between annular chamber 44 and relief hole 24, when head is in the withdrawn position with lateral wall 28 resting against annular shoulder 18 of main body 11; whereas sealing ring 47 engages the inner surface of hole 22 in fluidtight manner.

Operation of brewing apparatus 1 will now be described as of the operating position shown in FIG. 1, in which compression piston 8 is located outside seat 3, into which a measure of material 7 has previously been inserted, and head 12 is held by spring 13 in the extracted position. When head 12 is in this position, three-way valve 41 is in a fully open position, in which the annular chamber connects inlet portion 40 and outlet portion 26 of the outflow conduit to each other and to relief hole 24.

In this position, outflow conduit 27 therefore communicates with the outside via a beverage discharge end outlet (not shown), as well as via relief hole 24, and is therefore empty.

Next, compression piston 8 is positioned coaxially with axis 4, and is moved along axis 4 into seat 3 to compress material 7 inside infusion chamber 9, into which pressurized water is then fed in known manner to gradually impregnate material 7 and so produce the relative beverage.

As compression piston 8 is inserted inside seat 3, the friction between seal 30 and the inner surface of seat 3 arrests head 12, which only moves towards plate 5 when the free edge of lateral wall 28 of head 12 comes to rest against annular shoulder 18, i.e. only when head 12 reaches the withdrawn position. This reverse movement of head 12 with respect to main body 11 and in opposition to spring 13 moves three-way valve 41 into the closed position, in which fluidtight engagement of truncated-cone-shaped portion 23 of hole 22 by sealing ring 46 cuts off communication between annular chamber and relief hole 24, so the beverage formed in infusion chamber 9 flows along the whole of outflow conduit 27, bypassing relief hole 24.

When pressurized water supply to infusion chamber 9 is cut off and compression piston 8 extracted after the beverage is dispensed, friction between seal 30 and the inner surface of seat 3 arrests head 12 until transverse stop member 38 contacts plate 14, thus moving head 12 into the extracted position, and three-way valve 41 into the open position. In this position, annular chamber 44 is connected to the outside through relief hole 24, which has the dual advantage of connecting to the outside both infusion chamber 9, and outlet portion 26 of outflow conduit 27, thus completely draining the outflow conduit. The outside air drawn into infusion chamber 9 quickly dries material 7 inside seat 3, thus simplifying expulsion of material 7 by ejector piston 6.

The invention claimed is:

1. A beverage brewing apparatus, comprising:
    a cup-shaped body, and a compression piston which engages the cup-shaped body in fluidtight manner and is movable along the cup-shaped body to define, inside the cup-shaped body, an infusion chamber for housing material to be percolated and for receiving pressurized water;
    a beverage outflow conduit connecting the infusion chamber to the outside, the outflow conduit extending through the compression piston; and
    a valve located between an inlet portion and an outlet portion of the outflow conduit and formed inside the compression piston, the valve being a three-way valve having an inlet communicating with the infusion chamber via the inlet portion of the outflow conduit, a first outlet communicating with the outlet portion of the outflow conduit, and a second outlet communicating with the outside;
    wherein the compression piston is a telescopic piston comprising a main body, and a head which is coaxial with the main body along an axis, is connected telescopically to the main body, and is movable, with respect to the main body and along the axis, from a normal extracted position to a withdrawn position in opposition to elastic means; and
    wherein the three-way valve is a slide valve having a slide face formed on the main body, and a movable part carried by the head, wherein the slide face is defined by a hole formed, parallel to the axis, in the main body; and the movable part is defined by an appendix which is carried by the head, is parallel to the axis, and slides in fluidtight manner inside the hole.

2. A brewing apparatus as claimed in claim 1, wherein the hole communicates with the first and second outlet.

3. A brewing apparatus as claimed in claim 2, wherein the first and second outlet are respectively a radial outlet and an axial outlet with respect to the hole.

4. A brewing apparatus as claimed in claim 1, wherein the inlet portion of the outflow conduit is formed along the appendix; the inlet being defined by a diametrical hole formed in the appendix.

5. A brewing apparatus as claimed in claim 1, wherein the valve has a distribution chamber communicating at all times with the inlet and the first outlet, and only communicating with the second outlet when the valve is in the first position;

the appendix comprising, at its free end, a tip which engages the second outlet in fluidtight manner when the valve is in the second position; and the appendix having, below the tip, a smaller-section end portion defining, with the inner surface of the slide face, said distribution chamber.

6. A brewing apparatus as claimed in claim 1, wherein the valve is designed to selectively assume an open first position connecting the inlet and the first and second outlet to one another; and a second position closing the second outlet and connecting the inlet and the first outlet to each other.

7. A brewing apparatus as claimed in claim 6, wherein the valve has a distribution chamber communicating at all times with the inlet and the first outlet, and only communicating with the second outlet when the valve is in the first position.

* * * * *